Patented Dec. 30, 1930

1,787,402

UNITED STATES PATENT OFFICE

WILLIAM B. STODDARD, OF STAMFORD, CONNECTICUT, AND VAMAN R. KOKATNUR, OF NEW YORK, N. Y., ASSIGNORS TO PILOT LABORATORY, INC., OF ARLINGTON, NEW JERSEY, A CORPORATION OF NEW JERSEY

BLEACHING AGENT AND PROCESS OF MAKING THE SAME

No Drawing.    Application filed February 25, 1927. Serial No. 171,068.

This invention relates to bleaching agents and similar unstable organic compounds and more particularly to bleaching agents which depend upon the action of an organic peroxid or other analogous per-compound for their bleaching action and has for its principal object to produce an efficient bleaching material of this character which is substantially stable.

Organic peroxids and other analogous organic per-compounds are known to be unstable, inflammable and under certain conditions explosive. Consequently the handling of such compounds in various arts is a matter of considerable concern. Attempts have been made to diminish the lack of stability, inflammability and the explosibility of such compounds by intimately mixing inert materials therewith. The use of such inert materials as have been proposed for use for this purpose has however, important disadvantages. For example, peroxids mixed with such inert materials gradually lose a portion of their oxygen content in storage thereby becoming materially less efficient. In some cases the peroxids undergo a loss of strength of more than 50 per cent. This loss of strength is believed to be due to one or more of the following causes: local overheating, high temperatures in storage, drying and oxidation of adjoining oxidizable material, free moisture present in the composition or moisture from the air or from some other source which brings about the gradual decomposition of the peroxid material even at ordinary room temperatures thereby lessening its strength, and the presence of alkalinity in the inert material, which in the presence of free moisture causes rapid deterioration of the peroxid material.

Heretofore it has not been found practicable to dry such peroxids or other per-compounds to a substantially anyhydrous condition quickly and at a low temperature.

We have discovered that such deterioration of the peroxids can be substantially prevented and an efficient bleaching agent produced by rapidly removing the moisture from such peroxids by intimately mixing therewith an alkali-free compound preferably an inorganic salt, normally containing a substantial amount of water of crystallization, in an anhydrous condition, that is to say, free or substantially free from water of crystallization as well as superficial moisture. Upon mixing a moist peroxid with such anhydrous material the latter rapidly takes up as water of crystallization the water present in such peroxid. By thus removing the water from the peroxid quickly and at a low temperature, deterioration of such peroxids is substantially prevented. The presence of the water removed from the peroxid and taken up as water of crystallization by the stabilizing compound which is intimately mixed therewith very substantially lessens the explosiveness and combustibility of the peroxid. It also materially increases the stability of the peroxid by preventing its readily becoming overheated by the absorption of heat therefrom by the stabilizing material, which absorption of heat occurs when such compound gives up in whole or in part its water of crystallization upon the application of heat thereto. This liberation of water of crystallization in whole or in part and absorption of heat from the peroxid will in large measure occur at a temperature materially lower than that at which the peroxid would be detrimentally affected.

In the preferred practice of our invention solid organic peroxids such for example, as benzoyl peroxid, are produced by any known method and are filtered and washed substantially free from impurities. The resulting moist peroxid material ordinarily contains from 20 to 50 per cent. by weight of water. Instead of attempting to dry this material by ordinary means we remove the water by mixing with the moist peroxid finely powdered anhydrous alkali-free salt preferably sodium sulfate which is capable of taking up seven moles of water as water of crystallization. This mixing is done gradually without overheating and we prefer to employ in making this mixture an amount of the salt in from 5 to 10 per cent. excess over what is required to take up as water of crystallization all of the water present in the peroxid material. An anhydrous salt normally containing a substantial amount of water of crystallization such for example, as sodium sulfate in taking up water as water of crystallization gives out considerable heat. It is desirable therefore that the anhydrous salt be very gradually mixed with the peroxid and it also is advisable to add the stabilizing compound to the peroxid on a cooled surface or in a water jacketed container maintained at a low temperature as by the action of cold water or brine in the water jacket. A temperature of 6 to 10° C. in the mixing chamber is sufficiently low to prevent the peroxid being detrimentally affected during the mixing operation if the mixing is done slowly.

In a typical run in about one or two hours after the addition to and mixing of the anhydrous salt with the peroxid, the mixture became dry enough to be ground and such mixture after such period of time was reduced to a finely powdered form. The weight of the resulting powdered material was equal to that of the wet peroxid and the salt mixed therewith and the mixture was free from uncombined water.

The salt mixed with the peroxid serves the purpose of an inert filler in diminishing inflammability and explosibility. Furthermore it minimizes the deterioration of the peroxid material and consequent loss of strength due to hydrolysis by free moisture. Overheating of the material is prevented by the absorption of heat by the stabilizing salt in giving up its water of crystallization upon heat being applied thereto or produced within the mixture. By employing an excess of the anhydrous stabilizing material over that required to take up all of the water present in the moist peroxid such stabilizing material is in a condition to absorb additional water as water of crystallization and thus insure a substantially stable condition of the peroxid mixture for a considerable period of time. It will be understood that the employment of an excess of the stabilizing compound does not prevent the giving up of water of crystallization with consequent absorption of heat upon the application of heat to the mixture or the generation of heat therein even though such stabilizing compound is not fully saturated with respect to the amount of water of crystallization which it is capable of taking up.

Our method of producing the bleaching material is economical as it is not necessary to first dry the peroxid material which drying operation is both difficult and attended with the danger of fire or explosion. Furthermore, our product when the ingredients are mixed in the preferred proportions above indicated contains water combined as water of crystallization, in the proportion of more than 25 per cent. by weight of the peroxid present.

Our process is applicable to the stabilization of peroxids and analogous per-compounds in general but is particularly valuable in the stabilization of solid organic peroxids and per-compounds such for example as benzoyl peroxid, phthalyl peroxid, succinyl peroxid, fumaryl peroxid, benzoyl-acetyl peroxid, benzaldelyde peroxid and per-compounds derived therefrom.

We may employ as stabilizing agents any compound capable of taking up a substantial amount of water as water of crystallization and holding it at ordinary atmospheric temperatures and slightly above, as for example at 25 to 35° C., and that does not react with the peroxids or per-compounds. We prefer to employ as stabilizing agents finely powdered inorganic salts normally containing large proportions of water of crystallization such for example, as sodium sulfate, alum, and disodium phosphate. Sodium citrate also may be advantageously used.

It is to be understood that we may add to the moist peroxid or other per-compound only sufficient quantity of anhydrous material to absorb the water present therein but as above indicated, prefer to add an excess of the stabilizing agent.

The moist peroxid or other per-compound may if desired, be first partially freed from water as by pressing or centrifuging to reduce the water content to materially less than 50 per cent., as for example, to 25 per cent. When this is done the mixture will contain a materially greater proportion of the peroxid or like per-compound, as less of the anhydrous stabilizing material is needed to take up the water present. It is however, not advantageous to employ the stabilizing material in a proportion of less than about 25 per cent. by weight of the mixture.

While we have described in detail the preferred practice of our invention and proportions of ingredients, it is to be understood that the details of procedure may be variously modified and chemical equivalents of our reagents employed and that our invention is not limited to the preferred embodiment as hereinbefore described except as set forth in the appended claims.

We claim:

1. A drying step in the manufacture of a substantially dry bleaching composition wherein the bleaching agent in substantially wet condition is an intermediate product, which comprises mixing with the wet bleaching agent a compound normally containing water of crystallization but containing less than its normal content of water of crystallization whereby the water present in the bleaching agent will be taken up by the added compound as water of crystallization and a mixture substantially free from water obtained.

2. A drying step in the manufacture of a substantially dry oxidizing agent wherein the oxidizing agent in substantially wet condition is an intermediate product, which comprises mixing with the wet oxidizing agent a powdered compound normally containing water of crystallization but containing substantially less than its normal content of water of crystallization whereby the water present in the oxidizing agent will be taken up by the added compound as water of crystallization and a mixture substantially free from water obtained.

3. A drying step in the maunfacture of a substantially dry organic oxidizing agent wherein the organic oxidizing agent in substantially wet condition is an intermediate product, which comprises mixing with the wet material a compound normally containing a substantial amount of water of crystallization, such compound being in a substantially anhydrous condition whereby the water present in the organic oxidizing agent will be taken up by the added compound as water of crystallization and a mixture substantially free from water obtained.

4. A drying step in the manufacture of a substantially stable bleaching material wherein a peroxy compound in substantially wet condition is an intermediate product, which comprises mixing with the wet peroxy compound a compound normally containing water of crystallization but containing less than its normal content of water of crystallization whereby the moisture present in the peroxy compound will be taken up by the added compound as water of crystallization and a mixture substantially free from water obtained.

5. A drying step in the manufacture of a substantially stable bleaching material wherein an oxidizing agent in substantially wet condition is an intermediate product, which comprises adding to the wet oxidizing agent a compound substantially inert thereto and normally containing water of crystallization but containing less than its normal content of water of crystallization whereby the moisture present in the oxidizing agent will be taken up by the added compound as water of crystallization and a mixture substantially free from water obtained.

6. A drying step in the manufacture of a substantially stable bleaching agent wherein an organic peroxid in substantially wet condition is an intermediate product, which comprises adding to the wet organic peroxid in subdivided condition, a compound substantially inert thereto and normally containing a substantial amount of water of crystallization but containing less than its normal content of water of crystallization whereby the moisture present in the peroxid will be taken up by such compound as water of crystallization and a mixture substantially free from free water obtained.

7. A drying step in the manufacture of a substantially stable bleaching material wherein an organic peroxid in substantially wet condition is an intermediate product, which comprises mixing with the wet organic peroxid in finely divided condition, a powdered inorganic salt substantially inert thereto and normally containing a substantial amount of water of crystallization but containing less than its normal amount of water of crystallization whereby the moisture in the organic peroxid will be taken up by such salt as water of crystallization and a mixture substantially free from free water obtained.

8. A drying step in the manufacture of a substantially stable bleaching material wherein an organic peroxid in substantially wet condition is an intermediate product, which comprises adding to the wet organic peroxid in finely divided condition, a powdered inorganic salt substantially inert thereto and normally containing water of crystallization, said salt being in a substantially anhydrous condition, whereby the moisture in the peroxid will be taken up by such salt as water of crystallization and a mixture substantially free from free water obtained.

9. The step in the manufacture of a substantially stable bleaching material wherein an organic peroxid in substantially wet condition is an intermediate product, which comprises adding to the wet organic peroxid in finely divided condition, a powdered inorganic salt substantially inert thereto and normally containing water of crystallization, said salt being in a substantially anhydrous condition, more of the inorganic salt being added than is necessary to take up as water of crystallization the water present in the peroxid, whereby the moisture in the peroxid will be taken up by such salt as water of crystallization and a mixture substantially free from free water obtained.

10. A drying step in the manufacture of a substantially stable bleaching material wherein an organic bleaching agent in substantially wet condition is an intermediate product, which comprises gradually mixing with the wet bleaching agent a compound normally containing water of crystallization but containing less than its normal content of water of crystallization, said mixing being effected at a temperature of from 6° to 10° C.

In testimony whereof we affix our signatures.

WILLIAM B. STODDARD.
VAMAN R. KOKATNUR.